Sept. 26, 1950  P. STARK, JR  2,523,600
METHOD OF PLANT PROPAGATION
Filed Dec. 1, 1947
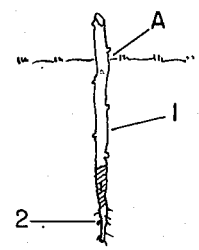
FIG. 1.
FIG. 2.
scion roots 1a
nurse root 2a
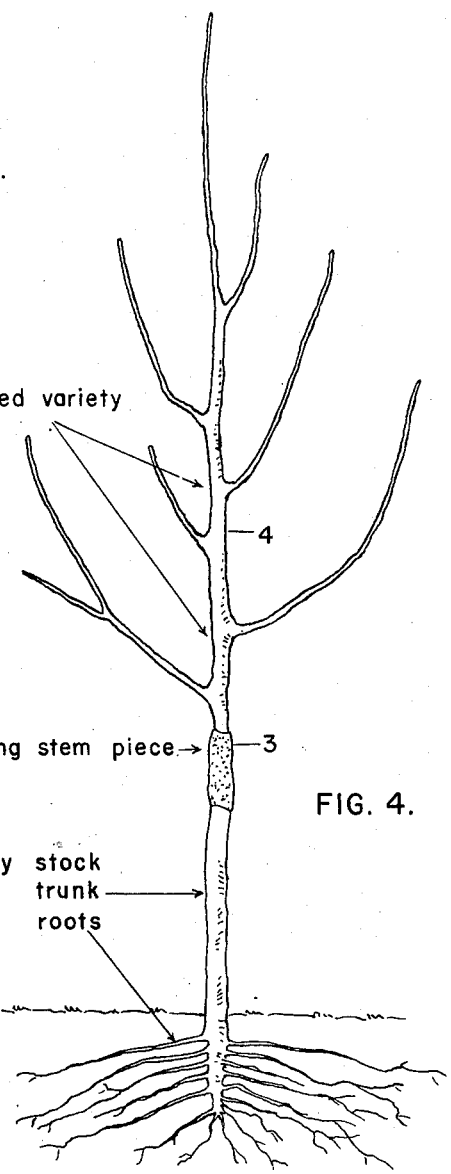
top of desired variety
desired variety
dwarfing stem piece
hardy stock trunk roots
FIG. 3.
FIG. 4.
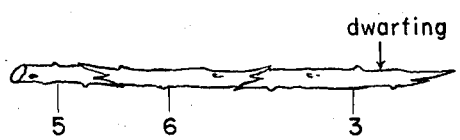
FIG. 5.
Inventor
Paul Stark, Jr.
By Robb & Robb
Attorneys Patented Sept. 26, 1950

2,523,600

UNITED STATES PATENT OFFICE 2,523,600

METHOD OF PLANT PROPAGATION

Paul Stark, Jr., Louisiana, Mo., assignor to Stark Bro's Nurseries and Orchards Company, Louisiana, Mo., a corporation of Missouri Application December 1, 1947, Serial No. 789,018

8 Claims. (Cl. 47—6)

The present invention relates to a novel method of propagating trees and other plants, having as its particular objects the shortening of the time required for the plants to reach orchard planting size and fruiting, more or less what may be called rapid mass production of trees on standardized stocks having known desirable characteristics by plural grafting of different varieties resulting in better unions of the grafts.

While this method is applicable to the propagation of standard size and variety plants of different types or classes, it is herein specifically disclosed in connection with propagation of dwarf fruit trees, the advantages of which are so well known as to need no extended explanation herein. It may be noted, however, that the planting of more varieties in limited spaces, facilitation of spraying, pruning and picking, younger bearing and special adaptation for yard and garden planting are some of the specific advantages obtained by the use of dwarf trees.

One of the important advantages arising from the use of my method is the mass production of fruit trees, particularly desirable in the case of dwarfed trees, with extremely hardy and sturdy trunks and roots, which serve as a protection against being blown over by wind and from winter injury due to extreme cold.

In carrying out my invention as above stated, one of the most important factors involved is the great saving of time and expense in the propagation and growing, for example, of a hardy and sturdy dwarf apple tree up to orchard planting size and fruit, through simultaneous grafting of plural scions in end to end relation upon sturdy and hardy root stock with a broad-spreading root system, at least one of such scions being a dwarfing interstem, and one or more scions of the variety or varieties desired. This method is to be distinguished from the customary "cleft grafting" of at least two separate scions on one stub of a trunk in the hope of at least one such graft surviving. While I might follow the procedure of grafting or budding the dwarfing variety scion on the hardy stock trunk and allow this dwarfing stem piece to grow for a season before grafting onto such stem piece the scion of the desired variety to be dwarfed, my method involves grafting together the dwarfing stem piece and the scion or scions of the desired fruiting varieties so that this as a unit may be grafted to the trunk of the hardy stock or to the nurse root variety trunk, as the case may be.

While this specific method of propagation is especially adapted to the dwarfing of fruit trees, it is not desired that the invention shall be limited to that class of plant propagation.

The specific steps followed in this method may be preliminarily explained in connection with the dwarfing of an apple tree of standard variety, to consist of first bench grafting a long scion of a variety of notable characteristics of hardiness and sturdiness with self-rooting tendency on a short seedling nurse-root. This long scion is preferably of the known Virginia Crab variety which has all of the desired qualities referred to and is relatively fast growing. This root graft is then placed in the nursery row deeply enough to insure rooting of the Virginia Crab, and the grafted stock is then allowed to grow for one season, that is to say specifically, from about March to winter of the first year.

As the next step, in the spring following (about March of the next year), a scion of the dwarfing variety and a scion of the desired fruiting variety, or if desired scions of more than one desired fruiting variety are first grafted together and then this scion combination unit is in turn grafted on the trunk of the Crab stock mentioned.

In making this simultaneous graft, care is exercised to select or use scions of approximately the same size or diameter. Growth of the desired variety or varieties proceeds under the control or influence of the dwarfing interstem so that by the fall of this same year, the desired fruiting variety has developed its branches and forms a dwarf tree. This is particularly true when using as the interstem dwarfing variety, a scion of Clark dwarf apple.

This method of dwarfing and the results obtained differ greatly from the customary practice of using a dwarf own-root stock on which to graft the standard variety, and moreover by my method I can grow not only one but more than one variety as a growth from superimposed interstem sections or end to end conjoined scions applied on a single trunk tree.

In the accompanying drawing is shown a diagrammatic illustration of the successive steps of my procedure, as follows:

Fig. 1 illustrates the setting of the bench graft of a nurse-root and long scion of a hardy and sturdy variety in the nursery row:

Fig. 2 shows the growth development from the long scion at the end of the first growing season and the root systems of both the nurse-root and the scion;

Fig. 3 shows the graft of the connected scions unit on the hardy stock trunk of the Crab;

Fig. 4 illustrates the growth attained by the desired fruiting variety from the enlarged growth of the Clark interstem dwarf variety during the first growing season; and Fig. 5 shows the method of joining or whip grafting of dwarfing scion and two scions of fruiting varieties as made ready to be simultaneously grafted to the hardy stock trunk in the field or nursery row as shown in Fig. 3.

Referring first to Fig. 1, it is to be understood that the hardy and sturdy stock variety designated 1 is grafted on to the short nurse-root 2. This graft is a bench graft and when a supply has been prepared they are set out in the nursery row, the root graft being set deeply enough to cover the hardy, sturdy variety scion to a point approximately as indicated in Fig. 1 of the drawing at A. I preferably employ this specific procedure so that most of the scion of the hardy stock is covered with moist earth, leaving one or two buds uncovered, which encourages the scion to strike root on its own wood, thus producing a hardy and sturdy broad-spreading root system, including the scion roots 1a and the nurse-roots 2a.

As hereinbefore generally explained, the hardy stock variety is permitted to grow to the fall of the year in which the root graft was made. This is represented in Figure 2 of the drawing, and, of course, the trunk will lose its foliage during the dormant winter period. In the spring of the following year, I cut back part of the trunk of the Virginia Crab variety and apply to it the composite graft of the dwarfing variety scion 3 and a scion of the desired fruiting variety 4, so that the dwarfing stem piece is an interstem element of a double graft of scions and trunk variety, as shown in Figure 3 of the drawing. The tree now goes forward with its growth as regards the scion 4, developing its branches during this same growing season, while the dwarfing stem piece enlarges or swells slightly so as to appear in the nature of a collar, as shown in Figure 4 of the drawing. It is within the purview of my method to employ a plurality of scions in conjunction with the dwarfing interstem so that the single tree may bear different varieties of apples or other fruit on branches coming from the same tree trunk. In carrying out this multiple form of grafting, the scions of the varieties desired, designated 5 and 6 in Figure 5 of the drawing, are joined to the dwarfing interstem or scion 3 and this composite unit is applied to the Virginia Crab trunk as hereinbefore described with reference to the illustration in Figure 3 of the drawing.

It follows from the foregoing disclosure that there are two primary features involved in the method of procedure in carrying out this invention, namely, the rapid production of a double root system or a heavy broad-spreading growth of roots which are particularly designed to support the tree when a heavy crop of fruit is produced, (so that staking or bracing, as often employed in the growing of dwarf fruit trees, may be eliminated), in conjunction with the simultaneous grafting together of scions of different varieties to form a composite stem unit for grafting onto the trunk of a hardy and sturdy stock.

The term "scion-rooted" as used herein refers to a tree in which roots are produced from a scion used in propagating as above described.

I claim:

1. A method of propagating representative individual plant varieties which comprises the step of simultaneously grafting together a plurality of desired fruiting varieties to form a graft unit and grafting such composite unit on a hardy, sturdy stock and root system.

2. A method of dwarfing representative individual plant varieties which comprises the step of simultaneously grafting together end to end a dwarfing interstock and a desired fruiting variety forming a composite scion onto a hardy, sturdy stock having the characteristic of producing roots from the section of the trunk in contact with the soil to provide a root system of known characteristics.

3. A method of dwarfing plant varieties by double grafting as set forth in claim 2, wherein the hardy root system is first produced from a scion-rooted, hardy stock, and thereafter the scions of the dwarfing and fruiting varieties are grafted together and to the stem of the hardy variety at one and the same time.

4. A method of dwarfing representative individual plant varieties which comprises the step of producing a scion-rooted hardy stock with a broad-spreading hardy root system and grafting to the stem of said root stock, scions of the dwarfing and fruiting varieties in end to end relation for simultaneous growth on the hardy stock.

5. A method of dwarfing plant varieties which comprises the step of producing a scion-rooted hardy stock with a double root system to increase its supporting, feeding and strength properties, grafting together a dwarfing interstock and one or more scions of desired fruiting varieties in end to end relationship and top-grafting such scions onto the hardy stock.

6. A method of propagating plant varieties which comprises grafting together a seedling nurse-root, a hardy self-rooting stock scion, and a plurality of desired fruiting varieties in end to end relationship at one and the same time.

7. A method of dwarfing representative individual plant varieties which comprises the step of simultaneously grafting together a dwarfing scion and a scion of the fruiting variety to be dwarfed, and at the same time grafting said combined scions on a seedling root stock.

8. A method of dwarfing representative individual plant varieties which comprises grafting a Virginia Crab scion on a nursing root stock, allowing said Crab scion to grow for a season, grafting together a Clark dwarf apple scion and a scion of the apple variety desired, and then grafting said combination of scions onto the trunk of the Virginia Crab.

PAUL STARK, Jr.

REFERENCES CITED

The following references are of record in the file of this patent:

UNITED STATES PATENTS

| Number | Name | Date |
|---|---|---|
| 2,202,966 | Rodocker | June 4, 1940 |

FOREIGN PATENTS

| Number | Country | Date |
|---|---|---|
| 337,182 | France | Feb. 8, 1904 |

OTHER REFERENCES

Illustrated Dictionary of Gardening (1886), vol. 2, p. 88.

Bailey: Standard Cyclo. Hort. (1943), vol. 1, p. 1083.

Bailey: Standard Cyclo. Hort. (1943), vol. 2, p. 1363.

Baltet, "Grafting and Budding" (1879), pp. 31, 40, 41, 42, 61, 62 and 63.